United States Patent
Hatakeyama (10) Patent No.: US 7,080,567 B2
(45) Date of Patent: Jul. 25, 2006

(54) PARALLEL SHAFT TRANSMISSION (75) Inventor: Kazuma Hatakeyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 184 days.

(21) Appl. No.: 10/898,305

(22) Filed: Jul. 26, 2004

(65) Prior Publication Data

US 2005/0028623 A1  Feb. 10, 2005

(30) Foreign Application Priority Data

Aug. 7, 2003 (JP) .............................. 2003-288688

(51) Int. Cl.
*F16H 3/08* (2006.01)

(52) U.S. Cl. ........................... 74/331; 74/325; 74/329; 74/330

(58) Field of Classification Search ................. 74/325, 74/329, 331, 340, 330, 339
See application file for complete search history.

(56) References Cited

U.S. PATENT DOCUMENTS

| | | | | |
|---|---|---|---|---|
| 4,226,135 A | * | 10/1980 | Winter | ........................ 74/330 |
| 4,682,516 A | | 7/1987 | Okubo | |
| 4,721,002 A | * | 1/1988 | Horii | ........................... 74/329 |
| 4,858,495 A | | 8/1989 | Horsch | |
| 5,445,041 A | | 8/1995 | Zaiser et al. | |

FOREIGN PATENT DOCUMENTS

| | | |
|---|---|---|
| DE | 198 60 250 C1 | 11/2000 |
| EP | 1 026 423 A2 | 8/2000 |
| EP | 1 026 423 A3 | 8/2000 |
| GB | 1 375 467 | 11/1974 |
| JP | 58054257 | 3/1983 |
| JP | 7-94854 | 10/1995 |
| JP | 2000-220700 | 8/2000 |
| JP | 2000220700 A * | 8/2000 |

OTHER PUBLICATIONS

"New Truck Transmission Shifts Smoothly", Machine Design, vol. 62, No. 4, Feb. 22, 1990, pp. 60-61.

* cited by examiner

Primary Examiner—Charles A. Marmor
Assistant Examiner—Tara L. Bolton
(74) Attorney, Agent, or Firm—Westerman, Hattori, Daniels & Adrian, LLP.

(57) ABSTRACT

An input shaft 10 is connected rotationally with a first countershaft 40 through a second main drive gear GM2V and a second main driven gear GM2N, and a second countershaft 50 is provided externally, coaxially and rotatably with respect to the first countershaft 40. A first main drive gear GM1V which is provided on the input shaft 10, always meshes with a first main driven gear GM1N, which is provided rotatably over the second countershaft 50. A fourth, sixth and seventh speed drive gear G467V, which is provided rotatably over the input shaft 10, always meshes both with a fourth speed drive gear G4V, which is provided rotatably over the second countershaft 50, and with a fourth, fifth, sixth and seventh speed driven gear G4567N, which is provided on the output shaft 60.

6 Claims, 5 Drawing Sheets

| | CT1 | CT2 | CT3 | CT4 | CT5 | CT6 | CT7 | CTD |
|---|---|---|---|---|---|---|---|---|
| Neutral | OFF | OFF | OFF | OFF | OFF | OFF | OFF | Fourth speed drive gear engaged |
| Forward first speed | ON | → | → | → | → | → | → | → |
| Forward second speed | OFF | ON | → | → | → | → | → | → |
| Forward third speed | → | OFF | ON | → | → | → | → | → |
| Forward fourth speed | → | → | OFF | ON | → | → | → | → |
| Forward fifth speed | → | → | → | OFF | ON | → | → | → |
| Forward sixth speed | → | → | → | → | OFF | ON | → | → |
| Forward seventh speed | → | → | → | ON | → | OFF | ON | → |
| Reverse drive | → | → | → | ON | → | → | OFF | Reverse drive gear engaged |

Fig. 3

|  | CT1 | CT2 | CT3 | CT4 | CT5 | CT6 | CT7 |
|---|---|---|---|---|---|---|---|
| Modification example 1 | ↓ | ↓ | ↓ | ↓ | CT6 | CT7 | CT5 |
| Modification example 2 | ↓ | ↓ | ↓ | CT5 | ↓ | ↓ | CT4 |
| Modification example 3 | ↓ | ↓ | ↓ | CT7 | CT5 | CT6 | ↓ |
| Modification example 4 | ↓ | ↓ | CT4 | CT3 | ↓ | CT7 | CT6 |
| Modification example 5 | ↓ | ↓ | ↓ | CT6 | ↓ | ↓ | CT3 |
| Modification example 6 | ↓ | ↓ | CT5 | CT3 | CT4 | ↓ | CT6 |
| Modification example 7 | ↓ | ↓ | ↓ | CT4 | CT3 | CT6 | CT7 |
| Modification example 8 | ↓ | ↓ | ↓ | CT6 | CT4 | CT7 | CT3 |
| Modification example 9 | ↓ | ↓ | ↓ | CT7 | CT3 | CT6 | CT4 |
| Modification example 10 | ↓ | ↓ | CT6 | CT4 | ↓ | CT7 | CT5 |
| Modification example 11 | ↓ | ↓ | ↓ | CT5 | ↓ | ↓ | CT4 |
| Modification example 12 | ↓ | CT3 | CT4 | CT2 | CT5 | CT6 | CT7 |
| Modification example 13 | ↓ | ↓ | ↓ | ↓ | CT6 | CT7 | CT5 |
| Modification example 14 | ↓ | ↓ | ↓ | CT5 | ↓ | ↓ | CT2 |
| Modification example 15 | ↓ | ↓ | ↓ | CT7 | CT5 | CT6 | ↓ |
| Modification example 16 | ↓ | ↓ | CT5 | CT2 | CT4 | ↓ | CT7 |
| Modification example 17 | ↓ | ↓ | ↓ | CT7 | ↓ | ↓ | CT2 |
| Modification example 18 | ↓ | ↓ | CT6 | CT2 | ↓ | CT7 | CT5 |
| Modification example 19 | ↓ | ↓ | ↓ | CT4 | CT2 | CT5 | CT7 |
| Modification example 20 | ↓ | ↓ | ↓ | CT5 | CT4 | CT7 | CT2 |
| Modification example 21 | ↓ | ↓ | ↓ | CT7 | CT2 | CT5 | CT4 |
| Modification example 22 | ↓ | ↓ | CT7 | CT4 | ↓ | CT6 | CT5 |
| Modification example 23 | ↓ | ↓ | ↓ | CT5 | ↓ | ↓ | CT4 |
| Modification example 24 | ↓ | CT4 | CT5 | CT2 | CT6 | CT7 | CT3 |
| Modification example 25 | ↓ | ↓ | ↓ | CT3 | ↓ | ↓ | CT2 |
| Modification example 26 | ↓ | ↓ | CT6 | CT2 | CT5 | ↓ | CT3 |
| Modification example 27 | ↓ | ↓ | ↓ | ↓ | CT3 | CT5 | CT7 |
| Modification example 28 | ↓ | ↓ | ↓ | CT3 | CT5 | CT7 | CT2 |
| Modification example 29 | ↓ | ↓ | ↓ | CT7 | CT3 | CT5 | ↓ |
| Modification example 30 | ↓ | ↓ | CT7 | CT2 | ↓ | CT6 | CT5 |
| Modification example 31 | ↓ | ↓ | ↓ | CT3 | CT2 | CT5 | CT6 |
| Modification example 32 | ↓ | ↓ | ↓ | CT5 | CT3 | CT6 | CT2 |
| Modification example 33 | ↓ | ↓ | ↓ | CT6 | CT2 | CT5 | CT3 |
| Modification example 34 | ↓ | CT5 | CT6 | CT2 | CT3 | CT4 | CT7 |
| Modification example 35 | ↓ | ↓ | ↓ | CT4 | CT2 | CT3 | ↓ |
| Modification example 36 | ↓ | ↓ | ↓ | CT7 | ↓ | ↓ | CT4 |
| Modification example 37 | ↓ | ↓ | ↓ | ↓ | CT3 | CT4 | CT2 |
| Modification example 38 | ↓ | ↓ | CT7 | CT2 | CT4 | CT6 | CT3 |
| Modification example 39 | ↓ | ↓ | ↓ | CT3 | CT2 | CT4 | CT6 |
| Modification example 40 | ↓ | ↓ | ↓ | ↓ | CT4 | CT6 | CT2 |
| Modification example 41 | ↓ | ↓ | ↓ | CT6 | CT2 | CT4 | CT3 |
| Modification example 42 | ↓ | CT6 | ↓ | CT2 | CT3 | ↓ | CT5 |
| Modification example 43 | ↓ | ↓ | ↓ | ↓ | CT4 | CT5 | CT3 |
| Modification example 44 | ↓ | ↓ | ↓ | CT3 | ↓ | ↓ | CT2 |
| Modification example 45 | ↓ | ↓ | ↓ | CT4 | CT2 | CT3 | CT5 |
| Modification example 46 | ↓ | ↓ | ↓ | CT5 | ↓ | ↓ | CT4 |
| Modification example 47 | ↓ | ↓ | ↓ | ↓ | CT3 | CT4 | CT2 |

| | CT1 | CT2 | CT3 | CT4 | CT5 | CT6 | CT7 | CT8 | CTD |
|---|---|---|---|---|---|---|---|---|---|
| Neutral | OFF | OFF | OFF | OFF | OFF | OFF | OFF | OFF | Fourth speed drive gear engaged |
| Forward first speed | ON | → | → | → | → | → | → | → | → |
| Forward second speed | OFF | ON | → | → | → | → | → | → | → |
| Forward third speed | → | OFF | ON | → | → | → | → | → | → |
| Forward fourth speed | → | → | OFF | ON | → | → | → | → | → |
| Forward fifth speed | → | → | → | OFF | ON | → | → | → | → |
| Forward sixth speed | → | → | → | → | OFF | ON | → | → | → |
| Forward seventh speed | → | → | → | → | → | OFF | ON | → | → |
| Forward eighth speed | → | → | → | → | → | → | OFF | ON | → |
| Reverse drive | → | → | → | ON | → | → | → | OFF | Reverse drive gear engaged |

PARALLEL SHAFT TRANSMISSION

FIELD OF THE INVENTION

The present invention relates to a parallel shaft transmission, in which gears are provided over a plurality of shafts disposed in parallel with one another, the gears being meshed in pairs so that the engagement and disengagement of gears to corresponding ones of the shafts establishes a power transmission path through the shafts in engagement to achieve a desirable speed change ratio, which corresponds to a momentary gear ratio of the transmission.

BACKGROUND OF THE INVENTION

Such parallel shaft transmissions are used in various powered machines including automobiles. In recent years, there has been a tendency that transmissions for use in vehicles are equipped with increasing numbers of speed change ratios because of demands for improvements in driving performance and of concerns on environmental effect. As a result, some transmissions that have more than five speed change ratios for forward drive have been developed for practical use. Generally, as the numbers of speed change ratios of transmissions increase, the numbers of gears disposed over the shafts also increase. This is said equally not only on vehicular transmissions but also on other types of transmissions. Therefore, transmissions tend to increase their sizes especially in the direction of their shafts. However, transmissions are designed to occupy certain limited amounts of space in specific machines or equipment in which they are intended to be installed. Therefore, various ideas have been applied to make the sizes of transmissions as compact as possible when the transmissions are designed to have increasing numbers of speed change ratios. Particularly in designing vehicular transmissions, whose sizes are limited by the sizes of respective vehicles accommodating the corresponding transmissions, it is important to take every measure that can make the transmissions as compact as possible.

Various such measures have been proposed to reduce the sizes of parallel shaft transmissions in axial direction. For example, a structural arrangement is known in which an extra shaft (intermediary shaft) is added between the input and output shafts of a transmission to reduce the number of gears per shaft (for example, refer to Japanese Laid-Open Patent Publication No. 2000-220700). In addition to this structural arrangement, another structural arrangement enables gears disposed on the output shaft to mesh with gears provided over the input shaft, to mesh also with gears provided over the intermediary shaft (for example, refer to Japanese Laid-Open Patent Publication No. 7(1995)-94854). In this arrangement, a gear on the output shaft is used commonly to establish two different speed change ratios, so that the number of gears disposed on the output shaft is made relatively small. Moreover, the gear on the input shaft and that on the intermediary shaft both meshing with such a commonly used gear on the output shaft are placed in a common plane in the transmission. As a result, the size of the transmission in the longitudinal direction of the shafts is much smaller than a similar transmission designed otherwise.

However, for recently developed transmissions with large numbers of speed change ratios, it is difficult to achieve a sufficient size reduction in axial direction by the above described structural arrangement in which a gear provided on the output shaft is used commonly for achieving two different speed change ratios. Therefore, there is a need for a new structural arrangement that can effect a size reduction in larger scale.

SUMMARY OF THE INVENTION

To solve the above mentioned problem, it is an object of the present invention to provide a parallel shaft transmission that has a compact structure with a relatively small dimension in its axial direction even though the transmission is equipped with a large number of speed change ratios.

A parallel shaft transmission according to the present invention comprises an input shaft, a first countershaft and an output shaft, which are disposed in parallel with one another, and further comprises a second countershaft, which is provided externally, coaxially and rotatably with respect to the first countershaft. In this parallel shaft transmission, an input-shaft first gear (for example, the first main drive gear GM1V described in the following embodiment) and an input-shaft second gear (for example, the second main drive gear GM2V described in the following embodiment) are provided on the input shaft, and an input-shaft third gear (for example, the fourth, sixth and seventh speed drive gear G467V described in the following embodiment) is provided rotatably on the input shaft, with first clutching means (for example, the sixth speed clutch CT6 described in the following embodiment) for connecting or disconnecting the input-shaft third gear to or from the input shaft. A first countershaft gear (for example, the second main driven gear GM2N described in the following embodiment) is provided on the first countershaft to mesh with the input-shaft second gear, and second clutching means (for example, the seventh speed clutch CT7 described in the following embodiment) is provided for connecting or disconnecting the first countershaft to or from the second countershaft. A second countershaft first gear (for example, the first main driven gear GM1N described in the following embodiment) is provided rotatably on the second countershaft to mesh with the input-shaft first gear, with third clutching means (for example, the fourth speed clutch CT4 described in the following embodiment) for connecting or disconnecting the second countershaft first gear to or from the second countershaft, and a second countershaft second gear (for example, the fourth speed drive gear G4V described in the following embodiment) is provided rotatably on the second countershaft to mesh with the input-shaft third gear, with fourth clutching means (for example, the selective clutch CTD described in the following embodiment) for connecting or disconnecting the second countershaft second gear to or from the second countershaft. An output-shaft first gear (for example, the fourth, fifth, sixth and seventh speed driven gear G4567N described in the following embodiment) is provided on the output shaft to mesh with the input-shaft third gear.

In this parallel shaft transmission, the rotational power of a prime mover (for example, an engine), which is input to the input shaft of the transmission, is transmitted to the first countershaft through the input-shaft second gear and the first countershaft gear. As a result, the first countershaft rotates in the direction opposite to that of the input shaft. Here, if (1) the first countershaft and the second countershaft are disconnected from each other, if (2) the second countershaft first gear is disconnected from the second countershaft, and if (3) the input-shaft third gear is disconnected from the input shaft, then the transmission is set in a neutral condition, where the rotational power of the prime mover is not transmitted to the output shaft. From this neutral condition, if the input-shaft third gear is connected to the input shaft, then the transmission is set into a first speed change condition (this speed change condition corresponds to the forward sixth speed condition described in the following embodiment). In the first speed change condition, the rotational power is transmitted from the input shaft by the first clutching means through the input-shaft third gear and the output-shaft first gear to the output shaft, so that the output shaft rotates in one direction (forward direction). Also, from the above mentioned neutral condition, if the first countershaft and the second countershaft are connected with each other, and if the second countershaft second gear is connected to the second countershaft, then the transmission is set into a second speed change condition (this speed change condition corresponds to the forward seventh speed condition described in the following embodiment). In the second speed change condition, the rotational power is transmitted from the input shaft through the input-shaft second gear and the first countershaft gear to the first countershaft, by the second clutching means to the second countershaft and then by the fourth clutching means through the second countershaft second gear, the input-shaft third gear (rotating over the input shaft) and the output-shaft first gear to the output shaft, so that the output shaft rotates in the above mentioned forward direction. Also, from the above mentioned neutral condition, if the second countershaft first gear is connected to the second countershaft, and if the second countershaft second gear is connected to the second countershaft, then the transmission is set into a third speed change condition (this speed change condition corresponds to the forward fourth speed condition described in the following embodiment). In the third speed change condition, the rotational power is transmitted from the input shaft through the input-shaft first gear and the second countershaft first gear and by the third clutching means to the second countershaft and then by the fourth clutching means through the second countershaft second gear, the input-shaft third gear (rotating over the input shaft) and the output-shaft first gear to the output shaft, so that the output shaft rotates in the above mentioned forward direction.

The parallel shaft transmission may further comprise an intermediary shaft and a first idle shaft (for example, the connecting idle shaft 30 described in the following embodiment), which are disposed in parallel with the input shaft. In this case, an input-shaft first gear (for example, the first main drive gear GM1V described in the following embodiment) is provided on the input shaft, and a first idle gear (for example, the connecting idle gear GCC described in the following embodiment) is provided on the first idle shaft to mesh with the input-shaft first gear. Furthermore, an intermediary shaft first gear (for example, the connecting driven gear GCN described in the following embodiment) is provided on the intermediary shaft to mesh with the first idle gear, and an intermediary shaft second gear (for example, the fifth speed drive gear G5V described in the following embodiment) is provided on the intermediary shaft to mesh with the output-shaft first gear. In addition, power-switching means (for example, the fifth speed clutch CT5 described in the following embodiment) is provided for enabling or disabling power transmission between the intermediary shaft first gear and the intermediary shaft second gear.

By this arrangement, because the rotational power is transmitted from the input shaft through the input-shaft first gear, the first idle gear and the intermediary shaft first gear to the intermediary shaft, the intermediary shaft rotates together with the input shaft in the same rotational direction. Here, after the above mentioned conditions (1), (2) and (3) are satisfied, if the power transmission between the intermediary shaft first gear and the intermediary shaft second gear is disabled, then the transmission is set in a neutral condition. From this neutral condition, if the the power transmission between the intermediary shaft first gear and the intermediary shaft second gear is enabled, then the transmission is set into a fourth speed change condition (this speed change condition corresponds to the forward fifth speed condition described in the following embodiment). In the fourth speed change condition, the rotational power is transmitted from the input shaft through the input-shaft first gear, the first idle gear, the intermediary shaft first gear, the intermediary shaft second gear and the output-shaft first gear to the output shaft, so that the output shaft rotates in the above mentioned forward direction.

In the parallel shaft transmission according to the present invention, preferably, the intermediary shaft second gear is provided rotatably on the intermediary shaft, and the power-switching means includes fifth clutching means (for example, the fifth speed clutch CT5 described in the following embodiment), which connects or disconnects the intermediary shaft second gear to or from the intermediary shaft. Moreover, the transmission may further comprise an input-shaft fourth gear (for example, the third speed and reverse drive gear G3RV described in the following embodiment), which is provided rotatably on the input shaft, with sixth clutching means (for example, the third speed clutch CT3 described in the following embodiment) for connecting or disconnecting the input-shaft fourth gear to or from the input shaft. Furthermore, the transmission comprises an intermediary shaft third gear (for example, the second speed drive gear G2V described in the following embodiment), which is provided rotatably on the intermediary shaft, with seventh clutching means (for example, the second speed clutch CT2 described in the following embodiment) for connecting or disconnecting the intermediary shaft third gear to or from the intermediary shaft, and an output-shaft second gear (for example, the second and third speed and reverse driven gear G23RN described in the following embodiment), which is provided on the output shaft to mesh with the input-shaft fourth gear and with the intermediary shaft third gear.

By this arrangement, after the above mentioned conditions (1), (2) and (3) are satisfied, additionally, if (4) the intermediary shaft second gear is disconnected from the intermediary shaft, if (5) the input-shaft fourth gear is disconnected from the input shaft, and if (6) the intermediary shaft third gear is disconnected from the intermediary shaft, then the transmission is set in a neutral condition. From this neutral condition, if the input-shaft fourth gear is connected to the input shaft, then the transmission is set into a fifth speed change condition (this speed change condition corresponds to the forward third speed condition described in the following embodiment). In the fifth speed change condition, the rotational power is transmitted from the input shaft by the sixth clutching means through the input-shaft fourth gear and the output-shaft second gear to the output shaft, so that the output shaft rotates in the above mentioned forward direction. Also, from the neutral condition, where the above mentioned conditions (1)~(6) are satisfied, if the intermediary shaft third gear is connected to the intermediary shaft, then the transmission is set into a sixth speed change condition (this speed change condition corresponds to the forward second speed condition described in the following embodiment). In the sixth speed change condition, the rotational power is transmitted from the input shaft through the input-shaft first gear, the first idle gear and the intermediary shaft first gear to the intermediary shaft. This rotation is then transmitted by the seventh clutching means through the intermediary shaft third gear and the output-shaft second gear to the output shaft, so that the output shaft rotates in the above mentioned forward direction.

The parallel shaft transmission according to the present invention may further comprise a second countershaft third gear (for example, the reverse drive gear GRV described in the following embodiment), which is provided rotatably on the second countershaft, a second idle shaft (for example, the reversing idle shaft 70 described in the following embodiment), which is disposed in parallel with the input shaft, a second idle gear (for example, the reverse idle gear GRI described in the following embodiment), which is provided on the second idle shaft to mesh with the second countershaft third gear and with the input-shaft fourth gear, and eighth clutching means (for example, the selective clutch CTD described in the following embodiment), which connects or disconnects the second countershaft third gear to or from the second countershaft. In this case, the fourth clutching means and the eighth clutching means comprise one selective clutching means (for example, the selective clutch CTD described in the following embodiment), which connects either the second countershaft second gear or the second countershaft third gear to the second countershaft.

By this arrangement, from the neutral condition, where the above mentioned conditions (1)~(6) are satisfied, if the second countershaft first gear is connected to the second countershaft, if the second countershaft second gear is disconnected from the second countershaft, and if the second countershaft third gear is connected to the second countershaft, then the transmission is set into a seventh speed change condition (this speed change condition corresponds to the reverse speed condition described in the following embodiment). In the seventh speed change condition, the rotational power is transmitted from the input shaft through the input-shaft first gear and the second countershaft first gear and by the third clutching means to the second countershaft. This rotation is then transmitted by the eighth clutching means through the second countershaft third gear, the second idle gear, the input-shaft fourth gear (rotating over the input shaft) and the output-shaft second gear to the output shaft, so that the output shaft rotates in the (reverse) direction opposite to the above mentioned forward direction.

In the parallel shaft transmission according to the present invention, preferably, the intermediary shaft is formed in a hollow figure, and an auxiliary intermediary shaft is provided internally, coaxially and rotatably with respect to the intermediary shaft. In this case, the transmission further comprises ninth clutching means (for example, the eighth speed clutch CT8 described in the following embodiment), which connects or disconnects the auxiliary intermediary shaft to or from the intermediary shaft, an auxiliary intermediary shaft gear (for example, the eighth speed drive gear G8V described in the following embodiment), which is provided on the auxiliary intermediary shaft, and an output-shaft third gear (for example, the eighth speed driven gear G8N described in the following embodiment), which is provided on the output shaft to mesh with the auxiliary intermediary shaft gear.

By this arrangement, after the above mentioned conditions (1)~(6) are satisfied, additionally, if the intermediary shaft and the auxiliary intermediary shaft are disconnected from each other, then the transmission is set in a neutral condition. From this neutral condition, if the intermediary shaft and the auxiliary intermediary shaft are connected with each other, then the transmission is set into an eighth speed change condition (this speed change condition corresponds to the forward eighth speed condition described in the following embodiment). In the eighth speed change condition, the rotational power is transmitted from the input shaft through the input-shaft first gear, the first idle gear and the intermediary shaft first gear to the intermediary shaft. This rotation is then transmitted by the ninth clutching means to the auxiliary intermediary shaft and then through the auxiliary intermediary shaft gear and the output-shaft third gear to the output shaft, so that the output shaft rotates in the above mentioned forward direction.

Even though the parallel shaft transmission according to the present invention achieves a plurality of speed change ratios for forward drive as described above, the size of the transmission in its axial direction is relatively small because the gear (output-shaft first gear) provided on the output shaft to rotate the output shaft in the forward direction in the first speed change condition is used commonly to rotate the output shaft in the forward direction also in the second speed change condition and in the third speed change condition. In short, this specific gear is a commonly used gear. In this way, the number of the gears to be provided on the output shaft is kept relatively small even though the transmission is equipped with this large number of forward speed change ratios. As a result, the transmission according to the present invention achieves a compact design notwithstanding the large number of speed change ratios. In addition, because the first countershaft and the second countershaft are provided radially one over the other, the number of the parts used for the transmission is kept smaller than otherwise, and the space for the installation of the shafts is also economized. As a result, the transmission according to the present invention achieves a design that is effective in reducing the weight as well as the manufacturing cost of the transmission.

Now, attention is given to the above mentioned case where the parallel shaft transmission further comprises an intermediary shaft and a first idle shaft, which are disposed in parallel with the input shaft, an input-shaft first gear, which is provided on the input shaft, a first idle gear, which is provided on the first idle shaft to mesh with the input-shaft first gear, an intermediary shaft first gear, which is provided on the intermediary shaft to mesh with the first idle gear, an intermediary shaft second gear, which is provided on the intermediary shaft to mesh with the output-shaft first gear, and power-switching means, which enables or disables power transmission between the intermediary shaft first gear and the intermediary shaft second gear. In this case, the gear (output-shaft first gear) provided on the output shaft to rotate the output shaft in the forward direction in the first speed change condition is used commonly to rotate the output shaft in the forward direction also in the second speed change condition, in the third speed change condition and in the fourth speed change condition. In this arrangement, the size of the transmission in its axial direction increases by the degree of only one gear for the increase of one additional speed change ratio. Therefore, the parallel shaft transmission achieves a relatively small size in axial direction for the large number of speed change ratios.

In the parallel shaft transmission, the gear provided on the input shaft to rotate the second countershaft can be used commonly to rotate the intermediary shaft. This arrangement contributes to the reduction of the size of the transmission in its axial direction.

Attention is given to the above mentioned arrangement where the intermediary shaft second gear is provided rotatably on the intermediary shaft, and the power-switching means includes fifth clutching means, which connects or disconnects the intermediary shaft second gear to or from the intermediary shaft, and where the transmission further comprises an input-shaft fourth gear, which is provided rotatably on the input shaft, sixth clutching means, which connects or disconnects the input-shaft fourth gear to or from the input shaft, an intermediary shaft third gear, which is provided rotatably on the intermediary shaft, seventh clutching means, which connects or disconnects the intermediary shaft third gear to or from the intermediary shaft, and an output-shaft second gear, which is provided on the output shaft to mesh with the input-shaft fourth gear and with the intermediary shaft third gear. In this arrangement, the gear (output-shaft second gear) provided on the output shaft to rotate the output shaft in the forward direction in the fifth speed change condition is used commonly to rotate the output shaft in the forward direction also in the sixth speed change condition. In this arrangement, the size of the transmission in its axial direction increases by the degree of only one gear for the increase of two additional speed change ratios for forward drive. Therefore, the size of the transmission in its axial direction is relatively small notwithstanding the large number of speed change ratios.

Also, attention is given to the above mentioned arrangement where the parallel shaft transmission further comprises a second countershaft third gear, which is provided rotatably on the second countershaft, a second idle shaft, which is disposed in parallel with the input shaft, a second idle gear, which is provided on the second idle shaft to mesh with the second countershaft third gear and with the input-shaft fourth gear, and eighth clutching means, which connects or disconnects the second countershaft third gear to or from the second countershaft. In this arrangement, the gear (output-shaft second gear) provided on the output shaft to rotate the output shaft in the forward direction in the fifth speed change condition is used commonly to rotate the output shaft in the forward direction in the sixth speed change condition and also to rotate the output shaft in the reversed rotational direction in the seventh speed change condition. In this way, the transmission is equipped with a reverse speed change ratio without any increase in the size of the transmission in its axial direction.

In the above described parallel shaft transmission, because the second countershaft second gear and the second countershaft third gear are never connected simultaneously to the second countershaft, the fourth clutching means and the eighth clutching means can comprise one selective clutching means, which connects either the second countershaft second gear or the second countershaft third gear to the second countershaft. This arrangement can further improve the lightness and compactness of the transmission.

Also, attention is given to the above mentioned arrangement where the intermediary shaft is formed in a hollow figure, and an auxiliary intermediary shaft is provided internally, coaxially and rotatably with respect to the intermediary shaft, and where the transmission further comprises ninth clutching means, which connects or disconnects the auxiliary intermediary shaft to or from the intermediary shaft, an auxiliary intermediary shaft gear, which is provided on the auxiliary intermediary shaft, and an output-shaft third gear, which is provided on the output shaft to mesh with the auxiliary intermediary shaft gear. In this arrangement, these shafts (i.e., the intermediary shaft and the auxiliary intermediary shaft) are disposed radially one over the other. This arrangement enables the transmission to acquire one additional speed change ratio for forward drive with an addition of only a few more parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 3 is a table listing examples of modification of the first embodiment, with each example of modification being described by contrasting the alphanumeric codes of the clutches in the first embodiment with those of each row of the modification list.

DESCRIPTION OF THE PREFERRED EMBODIMENTS

Figure 1:
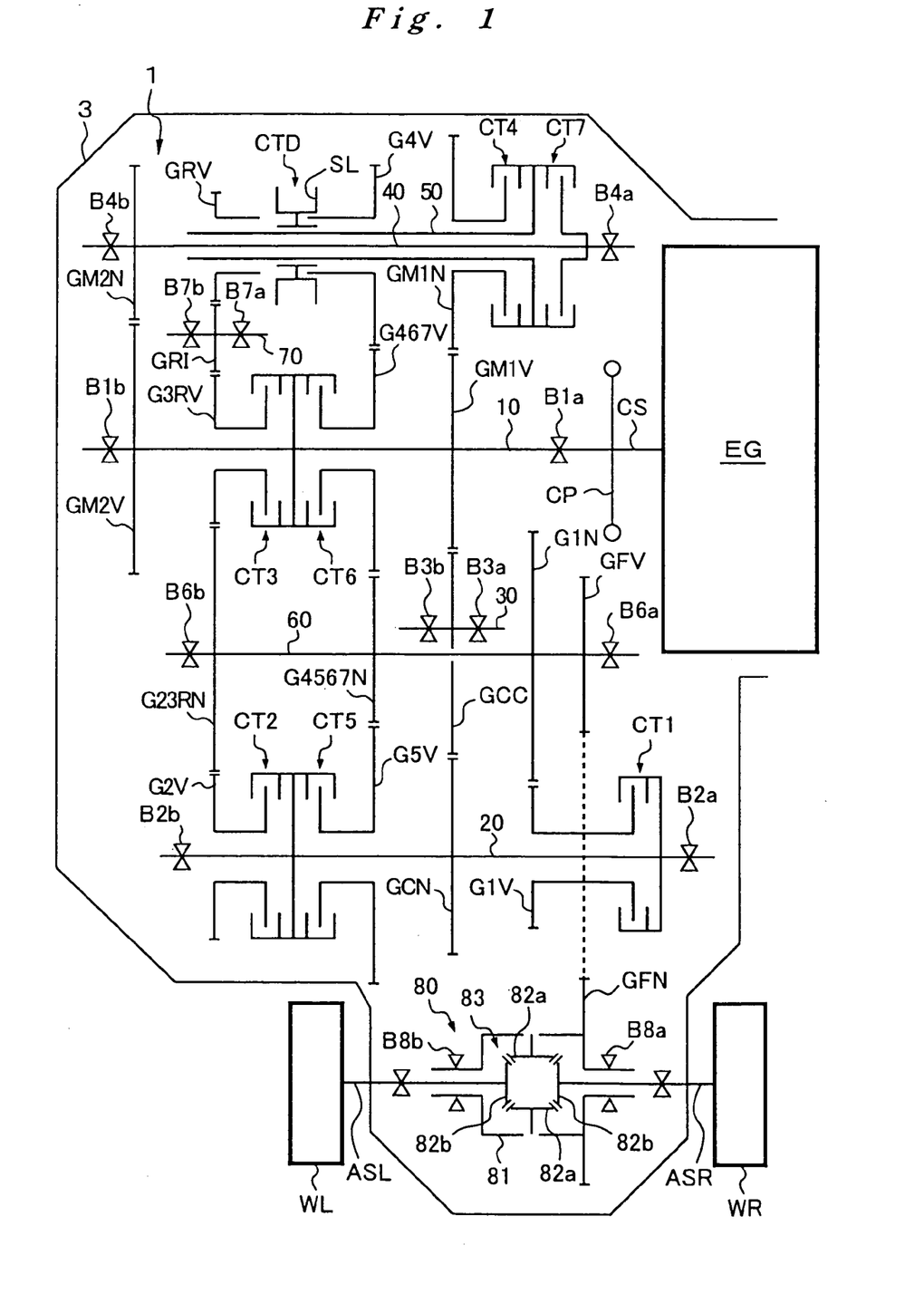
FIG. 1 is a skeleton diagram describing schematically the construction of a parallel shaft transmission as a first embodiment according to the present invention.

Now, preferred embodiments according to the present invention are described in reference to the drawings. FIG. 1 shows a first embodiment of parallel shaft transmission according to the present invention (hereinafter referred to as "the transmission"). The transmission 1 as a first embodiment converts the torque and rotational speed input from an engine EG and transmits the rotational power of the engine EG to a differential mechanism 80, which is connected rotationally to right and left drive wheels WL and WR.

The transmission 1 has an input shaft 10, a connecting idle shaft 30, an intermediary shaft 20, a first countershaft 40, a second countershaft 50, an output shaft 60 and a reversing idle shaft 70, all of which are disposed in parallel with one another and accommodated together with the differential mechanism 80 in a transmission case 3. The input shaft 10 is supported rotatably by bearings B1a and B1b and connected through a coupling mechanism CP to the crank-shaft CS of the engine EG. Over the input shaft 10, disposed from the side of the engine EG (i.e., from the right side of the drawing in FIG. 1) are a first main drive gear GM1V, a fourth, sixth and seventh speed drive gear G467V, a sixth speed clutch CT6, a third speed clutch CT3, a third speed and reverse drive gear G3RV and a second main drive gear GM2V. Here, the first main drive gear GM1V and the second main drive gear GM2V are each fixed on the input shaft 10 (i.e., not rotatable with respect to the input shaft 10) while the fourth, sixth and seventh speed drive gear G467V and the third speed and reverse drive gear G3RV are each provided rotatably over the input shaft 10 (i.e., rotatable with respect to the input shaft 10). The sixth speed clutch CT6 engages or disengages the fourth, sixth and seventh speed drive gear G467V to or from the input shaft 10, and the third speed clutch CT3 engages or disengages the third speed and reverse drive gear G3RV to or from the input shaft 10. Both the clutches CT6 and CT3 are friction clutches each incorporating a hydraulically actuated piston. Such a clutch is well-known in this field, so no additional description of these clutches is presented here.

The intermediary shaft 20 is supported also rotatably by bearings B2a and B2b. Over this shaft, disposed from the side of the engine EG (i.e., from the right side of the drawing in FIG. 1) are a first speed clutch CT1, a first speed drive gear G1V, a connecting driven gear GCN, a fifth speed drive gear G5V, a fifth speed clutch CT5, a second speed clutch CT2 and a second speed drive gear G2V Here, the first speed drive gear G1V, the fifth speed drive gear G5V and the second speed drive gear G2V are each disposed rotatably over the intermediary shaft 20, but the connecting driven gear GCN is fixed on the intermediary shaft 20. The first speed clutch CT1 engages or disengages the first speed drive gear G1V to or from the intermediary shaft 20, the fifth speed clutch CT5 engages or disengages the fifth speed drive gear G5V to or from the intermediary shaft 20, and the second speed clutch CT2 engages or disengages the second speed drive gear G2V to or from the intermediary shaft 20. These three clutches CT1, CT5 and CT2 are friction clutches of the same type as the above mentioned clutches CT6 and CT3, so no additional description of the clutches is provided here.

The connecting idle shaft 30 is supported also rotatably by bearings B3a and B3b, and a connecting idle gear GCC is provided fixedly on this shaft. The connecting idle gear GCC always meshes both with the first main drive gear GM1V, which is provided on the input shaft 10, and with the connecting driven gear GCN, which is provided on the intermediary shaft 20.

The first countershaft 40 is supported also rotatably by bearings B4a and B4b, and a second main driven gear GM2N is provided fixedly on this shaft. The second main driven gear GM2N always meshes with the second main drive gear GM2V, which is provided on the input shaft 10.

The second countershaft 50 is disposed coaxially external to the first countershaft 40 and rotatable with respect to the first countershaft 40. Over this shaft, disposed from the side of the engine EG (i.e., from the right side of the drawing in FIG. 1) are a seventh speed clutch CT7, a fourth speed clutch CT4, a first main driven gear GM1N, a fourth speed drive gear G4V, a selective clutch CTD and a reverse drive gear GRV. Here, the first main driven gear GM1N, the fourth speed drive gear G4V and the reverse drive gear GRV are provided each rotatably over the second countershaft 50. The seventh speed clutch CT7 engages or disengages the second countershaft 50 to or from the first countershaft 40, and the fourth speed clutch CT4 connects or disconnects the first main driven gear GM1N to or from the second countershaft 50. Both these clutches CT7 and CT4 are well-known friction clutches of the same type as the above mentioned clutches, each of which has a hydraulically actuated piston, so no additional description of these clutches is provided here. The selective clutch CTD, which is provided axially slidably on the second countershaft 50, is integrated with a selector SL whose position over the second countershaft 50 is controlled to shift axially by the operation of a hydraulic mechanism (not shown). When the selector SL is shifted in either direction, the dog teeth (not shown) of the selective clutch CTD clutches the closer side of the fourth speed drive gear G4V or that of the reverse drive gear GRV, correspondingly. As a result, either the fourth speed drive gear G4V or the reverse drive gear GRV is connected rotationally to the second countershaft 50. In other words, if the selector SL of the selective clutch CTD is shifted onto the side of the fourth speed drive gear G4V (rightward in the drawing of FIG. 1), then the fourth speed drive gear G4V is connected to the second countershaft 50. On the other hand, if the selector SL is shifted onto the side of the reverse drive gear GRV (leftward in the drawing of FIG. 1), then the reverse drive gear GRV is connected to the second countershaft 50.

The output shaft 60 is supported also rotatably by bearings B6a and B6b. Over this shaft, disposed from the side of the engine EG (i.e., from the right side of the drawing in FIG. 1) are a differential drive gear GFV, a first speed driven gear G1N, a fourth, fifth, sixth and seventh speed driven gear G4567N and a second and third speed and reverse driven gear G23RN. Here, the differential drive gear GFV, the first speed driven gear G1N, the fourth, fifth, sixth and seventh speed driven gear G4567N and the second and third speed and reverse driven gear G23RN are each fixed on the output shaft 60. The differential drive gear GFV always meshes with a differential driven gear GFN, which drives the differential mechanism 80 (the broken line drawn between the differential drive gear GFV and the differential driven gear GFN in FIG. 1 represents that these gears GFV and GFN mesh with each other. The same is said for FIG. 4). The first speed driven gear G1N always meshes with the first speed drive gear G1V which is provided on the intermediary shaft 20, and the fourth, fifth, sixth and seventh speed driven gear G4567N always meshes both with the fourth, sixth and seventh speed drive gear G467V, which is provided on the input shaft 10, and with the fifth speed drive gear G5V, which is provided on the intermediary shaft 20. The second and third speed and reverse driven gear G23RN always meshes both with the third speed and reverse drive gear G3RV, which is provided on the input shaft 10, and with the second speed drive gear G2V, which is provided on the intermediary shaft 20.

The reversing idle shaft 70 is supported also rotatably by bearings B7a and B7b, and a reverse idle gear GRI is fixed on this shaft. The reverse idle gear GRI always meshes both with the third speed and reverse drive gear G3RV, which is provided on the input shaft 10, and with the reverse drive gear GRV, which is provided on the second countershaft 50.

The differential mechanism 80 has a differential mechanism 83 in a differential case 81, the differential mechanism 83 comprising two differential pinions 82a and two side gears 82b. Right and left axles ASR and ASL, which are disposed in parallel with the output shaft 60, are fixed to the side gears 82b, respectively, and the differential case 81 is supported by bearings B8a and B8b. In this condition, the differential case 81 can rotate around the axis of the right and left axles ASR and ASL, which have, correspondingly, right and left drive wheels WR and WL (front wheels of the vehicle). Because the differential driven gear GFN, which is fixed on the differential case 81, always meshes with the differential drive gear GFV as mentioned above, the whole of the differential mechanism 80 rotates around the right and left axles ASR and ASL as the output shaft 60 rotates.

Figure 2:
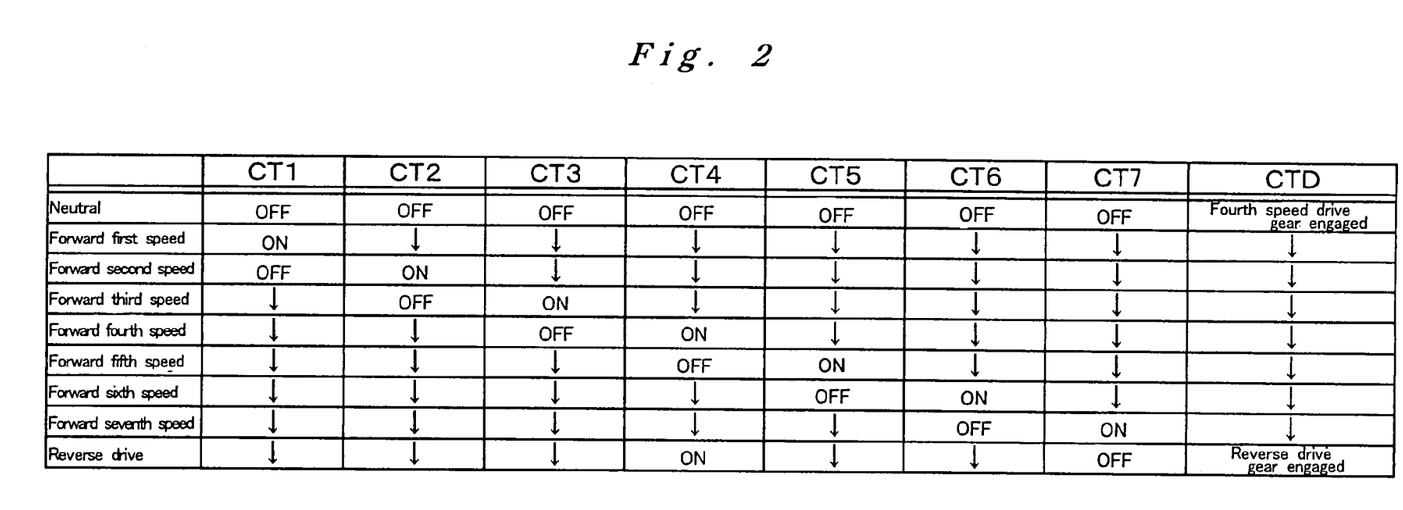
FIG. 2 is a table describing relations between the condition of first~seventh clutches and a selective clutch and the speed change ratio of the first embodiment transmission.

Now, in reference to FIG. 1 and to FIG. 2, power transmission paths available in the transmission 1 are described in relation to the condition of the transmission 1. FIG. 2 is a table describing relations between the operational condition of the first~seventh clutches CT1, CT2, CT3, CT4, CT5, CT6 and CT7 and the selective clutch CTD and the speed change ratios of the transmission 1. The columns with headings CT1, CT2, CT3, CT4, CT5, CT6 and CT7 in the table represent the corresponding clutches, respectively, and in each column, a cell marked by "ON" represents that the clutch represented by the column is set to connect the corresponding gear to the corresponding shaft (i.e., the input shaft 10 or the intermediary shaft 20). If a cell is marked by "OFF", then it represents that the clutch is set to disconnect the corresponding gear from the corresponding shaft (i.e., the input shaft 10 or the intermediary shaft 20). In each column, a cell marked by a downward arrow represents the same condition for the clutch as represented by the cell right above.

The rotational power of the engine EG is input from the crank-shaft CS through the coupling mechanism CP to the input shaft 10 of the transmission 1, and it is then transmitted through the first main drive gear GM1V, the connecting idle gear GCC and the connecting driven gear GCN to the intermediary shaft 20. As a result, the intermediary shaft 20 rotates together with the input shaft 10 in the same rotational direction. Also, the rotational power of the engine EG is transmitted from the input shaft 10 through the second main drive gear GM2V and the second main driven gear GM2N to the first countershaft 40. As a result, the first countershaft 40 rotates together with the input shaft 10 but in the direction opposite to that of the input shaft 10. In this condition, if the first speed clutch CT1, the second speed clutch CT2, the third speed clutch CT3, the fourth speed clutch CT4, the fifth speed clutch CT5, the sixth speed clutch CT6 and the seventh speed clutch CT7 are all off, then the first speed drive gear G1V, the fifth speed drive gear G5V and the second speed drive gear G2V are all disconnected rotationally from the intermediary shaft 20; the fourth, sixth and seventh speed drive gear G467V and the third speed and reverse drive gear G3RV are also disconnected from the input shaft 10; the first countershaft 40 and the second countershaft 50 are disconnected rotationally from each other; and the first main driven gear GM1N is disconnected from the second countershaft 50. As a result, the rotational power of the engine EG is not transmitted to the output shaft 60. This is a neutral condition of the transmission 1. In this neutral condition, the selector SL of the selective clutch CTD is positioned to the fourth speed drive gear G4V. In other words, the fourth speed drive gear G4V is engaged to the second countershaft 50 while the reverse drive gear GRV is disengaged from the second countershaft 50.

To switch the transmission 1 from the above described neutral condition to a forward first speed condition, the first speed clutch CT1 is turned from "OFF" to "ON" to connect the first speed drive gear G1V to the intermediary shaft 20. In this condition, or the forward first speed condition of the transmission 1, the power of the engine EG, which is transmitted from the input shaft 10 through the first main drive gear GM1V, the connecting idle gear GCC and the connecting driven gear GCN to the intermediary shaft 20, is transmitted by the first speed clutch CT1 through the first speed drive gear G1V and the first speed driven gear G1N to the output shaft 60.

To switch the transmission 1 from the forward first speed condition to a forward second speed condition, the first speed clutch CT1 is turned from "ON" to "OFF", and the second speed clutch CT2 is turned from "OFF" to "ON". As a result, the first speed drive gear G1V is disconnected from the intermediary shaft 20 while the second speed drive gear G2V is connected to the intermediary shaft 20. In this condition, or the forward second speed condition of the transmission 1, the power of the engine EG, which is transmitted from the input shaft 10 through the first main drive gear GM1V, the connecting idle gear GCC and the connecting driven gear GCN to the intermediary shaft 20, is transmitted by the second speed clutch CT2 through the second speed drive gear G2V and the second and third speed and reverse driven gear G23RN to the output shaft 60.

To switch the transmission 1 from the forward second speed condition to a forward third speed condition, the second speed clutch CT2 is turned from "ON" to "OFF", and the third speed clutch CT3 is turned from "OFF" to "ON". As a result, the second speed drive gear G2V is disconnected from the intermediary shaft 20 while the third speed and reverse drive gear G3RV is connected to the input shaft 10. In this condition, or the forward third speed condition of the transmission 1, the power of the engine EG is transmitted from the input shaft 10 by the third speed clutch CT3 through the third speed and reverse drive gear G3RV and the second and third speed and reverse driven gear G23RN to the output shaft 60.

To switch the transmission 1 from the forward third speed condition to a forward fourth speed condition, the third speed clutch CT3 is turned from "ON" to "OFF", and the fourth speed clutch CT4 is turned from "OFF" to "ON". As a result, the third speed and reverse drive gear G3RV is disconnected from the input shaft 10 while the first main driven gear GM1N is connected to the second countershaft 50. In this condition, or the forward fourth speed condition of the transmission 1, the power of the engine EG, which is transmitted from the input shaft 10 through the first main drive gear GM1V to the first main driven gear GM1N, is transmitted by the fourth speed clutch CT4 to the second countershaft 50. This rotation is then transmitted by the selective clutch CTD through the fourth speed drive gear G4V, the fourth, sixth and seventh speed drive gear G467V (rotating over the input shaft 10) and the fourth, fifth, sixth and seventh speed driven gear G4567N to the output shaft 60.

To switch the transmission 1 from the forward fourth speed condition to a forward fifth speed condition, the fourth speed clutch CT4 is turned from "ON" to "OFF", and the fifth speed clutch CT5 is turned from "OFF" to "ON". As a result, the first main driven gear GM1N is disconnected from the second countershaft 50 while the fifth speed drive gear G5V is connected to the intermediary shaft 20. In this condition, or the forward fifth speed condition of the transmission 1, the power of the engine EG, which is transmitted from the input shaft 10 through the first main drive gear GM1V, the connecting idle gear GCC and the connecting driven gear GCN to the intermediary shaft 20, is transmitted by the fifth speed clutch CT5 through the fifth speed drive gear G5V and the fourth, fifth, sixth and seventh speed driven gear G4567N to the output shaft 60.

To switch the transmission 1 from the forward fifth speed condition to a forward sixth speed condition, the fifth speed clutch CT5 is turned from "ON" to "OFF", and the sixth speed clutch CT6 is turned from "OFF" to "ON". As a result, the fifth speed drive gear G5V is disconnected from the intermediary shaft 20 while the fourth, sixth and seventh speed drive gear G467V is connected to the input shaft 10. In this condition, or the forward sixth speed condition of the transmission 1, the power of the engine EG is transmitted from the input shaft 10 by the sixth speed clutch CT6 through the fourth, sixth and seventh speed drive gear G467V and the fourth, fifth, sixth and seventh speed driven gear G4567N to the output shaft 60.

To switch the transmission 1 from the forward sixth speed condition to a forward seventh speed condition, the sixth speed clutch CT6 is turned from "ON" to "OFF", and the seventh speed clutch CT7 is turned from "OFF" to "ON". As a result, the fourth, sixth and seventh speed drive gear G467V is disconnected from the input shaft 10 while the first countershaft 40 and the second countershaft 50 are connected to each other. In this condition, or the forward seventh speed condition of the transmission 1, the power of the engine EG is transmitted from the input shaft 10 through the second main drive gear GM2V and the second main driven gear GM2N to the first countershaft 40. This rotation is then transmitted by the seventh speed clutch CT7 to the second countershaft 50 and then by the selective clutch CTD through the fourth drive gear G4V, the fourth, sixth and seventh speed drive gear G467V (rotating over the input shaft) and the fourth, fifth, sixth and seventh speed driven gear G4567N to the output shaft 60.

Furthermore, to switch the transmission 1 from the above described neutral condition to a reverse speed condition, the fourth speed clutch CT4 is turned from "OFF" to "ON", and the selector SL of the selective clutch CTD is shifted from the fourth speed drive gear G4V to the reverse drive gear GRV. As a result, the first main driven gear GM1N is connected to the second countershaft 50 while the reverse drive gear GRV is connected also to the second countershaft 50. In this condition, or the reverse speed condition of the transmission 1, the power of the engine EG, which is transmitted from the input shaft 10 through the first main drive gear GM1V to the first main driven gear GM1N, is then transmitted by the fourth speed clutch CT4 to the second countershaft 50 and further transmitted by the selective clutch CTD through the reverse drive gear GRV, the reverse idle gear GRI, the third speed and reverse drive gear G3RV (rotating over the input shaft 10) and the second and third speed and reverse driven gear G23RN to the output shaft 60.

In the transmission 1 as a first embodiment, which achieves seven forward speed change ratios and one reverse speed change ratio as described above, the gear (fourth, fifth, sixth and seventh speed driven gear G4567N) provided on the output shaft 60 to rotate the output shaft 60 in the forward direction in the forward fourth speed condition is used commonly to rotate the output shaft 60 in the forward direction also in the forward fifth speed condition, in the forward sixth speed condition and in the forward seventh speed condition. In short, this specific gear is a commonly used gear. In this way, the number of the gears to be provided on the output shaft 60 for achieving this large number of forward speed change ratios is kept relatively small. As a result, the size of the transmission 1 in its axial direction is relatively small, so the transmission 1 has a compact design.

Furthermore, in the transmission 1, the second and third speed and reverse driven gear G23RN is provided as a commonly used gear on the output shaft 60 to rotate the output shaft 60 in the forward rotational direction both in the forward second speed condition and in the forward third speed condition and also to rotate the output shaft 60 in the reversed rotational direction in the reverse speed condition. In this way, the transmission 1 is equipped with a reverse speed change ratio without increasing the size of the transmission in its axial direction.

In the construction of the transmission 1, if the connecting idle gear GCC is provided rotatably over the first countershaft 40, then the connecting idle shaft 30 can be eliminated. However, the provision of the connecting idle shaft 30 to support the connecting idle gear GCC beside the first countershaft 40 enables gears to be used commonly as described above and also increases the freedom in determining the ratio of each speed change condition. Also, by this arrangement, the distance between the input shaft 10 and the first countershaft 40 (and the second countershaft 50) and the distance between the first countershaft 40 and the intermediary shaft 20 are made substantially equal to each other, and thereby, each distance among the shafts is kept relatively short. As a result, the diameters of the gears are made relatively small. Therefore, the diameter of the transmission case 3 is also made small, lightening the transmission greatly.

In the above described transmission as a first embodiment, the on and off actions of the first~seventh speed clutches CT1, CT2, CT3, CT4, CT5, CT6 and CT7 for each speed change ratio are determined in correspondence to the diameters of the gears and the distances among the shafts. Therefore, the combination of the on and off actions of the clutches for each speed change ratio presented in the above description is only an example. In other words, a variety of combinations of the on and off actions of the clutches are possible for the transmission 1 if the gears have different diameters with correspondingly different distances among the shafts. For example, another transmission can be designed with the same number of speed change ratios (seven forward speed change ratios and one reverse speed change ratio) as the above described transmission 1 as a first embodiment by replacing the actions of the fifth speed clutch CT5 for each speed change ratio in the above described first embodiment with those of the sixth speed clutch CT6, by replacing the actions of the sixth speed clutch CT6 for each speed change ratio with those of the seventh speed clutch CT7, and by replacing the actions of the seventh speed clutch CT7 for each speed change ratio with those of the fifth speed clutch CT5 (refer to modification example 1 in the table of FIG. 3). The table in FIG. 3 lists such examples. They are modifications of the first embodiment achieved by changing the combination of the on and off actions of the first~seventh speed clutches CT1, CT2, CT3, CT4, CT5, CT6 and CT7. In the table, each modification example is described by contrasting the alphanumeric codes "CT1", . . . and "CT7" of the clutches in the first embodiment with those of the clutches in each modification example or in each row of the modification list.

Figure 4:
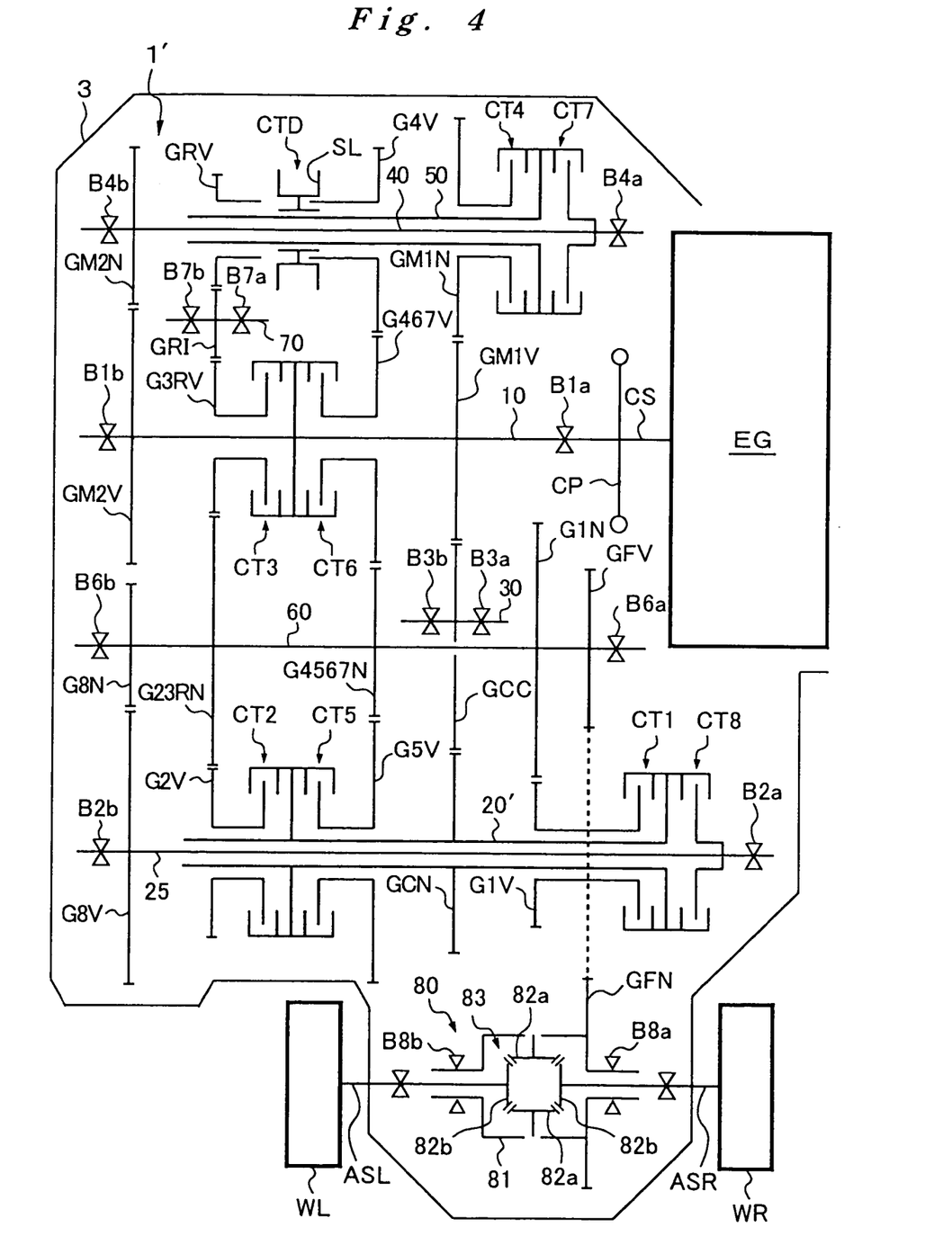
FIG. 4 is a skeleton diagram describing schematically the construction of a parallel shaft transmission as a second embodiment according to the present invention.

Next, a second embodiment of transmission according to the present invention is described in reference to FIG. 4, which shows a transmission 1' as a second embodiment. In the drawing, components that are identical with those of the transmission 1 described above as a first embodiment are given identical numbers, respectively. Differences between the transmission 1' as a second embodiment and the transmission 1 as a first embodiment are as follows: the intermediary shaft 20 is formed hollow (this hollow intermediary shaft is marked by 20'); an auxiliary intermediary shaft 25 is provided coaxially and rotatably inside the intermediary shaft 20'; an eighth speed clutch CT8 is provided for engaging or disengaging the intermediary shaft 20' to or from the auxiliary intermediary shaft 25; an eighth speed drive gear G8V is provided fixedly on the auxiliary intermediary shaft 25; and an eighth speed driven gear G8N is provided fixedly between the second and third speed and reverse driven gear G23RN and the bearing B6b on the output shaft 60. In this case, the eighth speed driven gear G8N always meshes with the eighth speed drive gear G8V.

Figure 5:
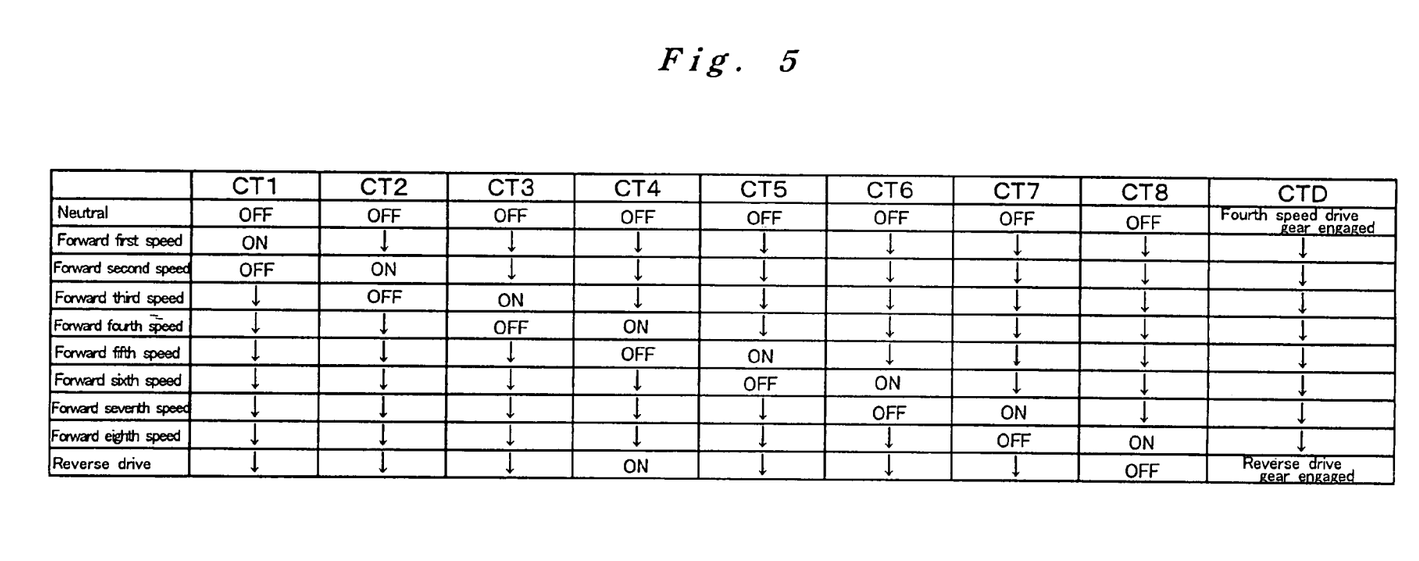
FIG. 5 is a table describing relations between the condition of first~eighth clutches and a selective clutch and the speed change ratio of the second embodiment transmission.

FIG. 5 is a table that describes relations between the operational condition of the first~eighth clutches CT1, CT2, CT3, CT4, CT5, CT6, CT7 and CT8 and the selective clutch CTD and the speed change ratios of the transmission 1' as a second embodiment. In reference to the table, the power transmission paths of the transmission 1' are described in relation to the speed change ratios of the transmission 1'. However, except that the eighth speed clutch CT8 is always turned "OFF", the condition of the clutches and the gears of the transmission 1' as a second embodiment is the same as that of the transmission 1 as a first embodiment in the following cases: the transmission 1' is in its neutral condition, is upshifted from the neutral condition to its forward first speed condition, is upshifted from the forward first speed condition to its forward second speed condition, is upshifted from the forward second speed condition to its forward third speed condition, is upshifted from the forward third speed condition to its forward fourth speed condition, is upshifted from the forward fourth speed condition to its forward fifth speed condition, is upshifted from the forward fifth speed condition to its forward sixth speed condition, is upshifted from the forward sixth speed condition to its forward seventh speed condition and is shifted from the neutral condition to its reverse speed condition. Therefore, no description is given here for these cases.

To switch the transmission 1' as a second embodiment from the forward seventh speed condition to a forward eighth speed condition, the seventh speed clutch CT7 is turned from "ON" to "OFF", and the eighth speed clutch CT8 is turned from "OFF" to "ON". As a result, the first countershaft 40 and the second countershaft 50 are disconnected from each other while the intermediary shaft 20' and the auxiliary intermediary shaft 25 are connected to each other. In this condition, or the forward eighth speed condition of the transmission 1', the power of the engine EG, which is transmitted from the input shaft 10 through the first main drive gear GM1V, the connecting idle gear GCC and the connecting driven gear GCN to the intermediary shaft 20', is transmitted by the eighth speed clutch CT8 to the auxiliary intermediary shaft 25 and then through the eighth speed drive gear G8V and the eighth speed driven gear G8N to the output shaft 60.

In the above described ways, the transmission 1' as a second embodiment achieves eight forward speed change ratios and one reverse speed change ratio. In the construction of the transmission 1', the auxiliary intermediary shaft 25 is enclosed in the intermediary shaft 20'. This arrangement, which adds only a few parts to the transmission 1 as a first embodiment, enables the transmission to acquire one more speed change ratio for forward drive without any increase in the size in axial direction.

By the way, in a structure that includes a gear train provided over three shafts with component gears meshing simultaneously, such as the structure of the above described transmissions (transmission 1 and transmission 1'), gears may experience a "sway" because of the axial thrusts generated from the contact of tooth faces of the gears during the torque transmission. As a result, a noise may be generated if the tooth bearing of the gears becomes insufficient. To avoid such discomfort, or to control the generation of such noise, the three shafts whose gears mesh with one another simultaneously, i.e., the input shaft 10, the intermediary shaft 20 (or the intermediary shaft 20' and the auxiliary intermediary shaft 25) and the output shaft 60, can be disposed in a common plane to reduce the effect of the "sway" of these gears.

Preferred embodiments according to the present invention have been described above. However, the scope of the present invention is not limited to the above described embodiments. For example, in the above embodiments, selective clutching means (selective clutch CTD) is used to connect either the fourth speed drive gear G4V or the reverse drive gear GRV because the fourth speed drive gear G4V and the reverse drive gear GRV are never connected simultaneously to the second countershaft 50. In other words, this clutching means as a unit functions both as clutching means that connects or disconnects the fourth speed drive gear G4V to or from the second countershaft 50 and as clutching means that connects or disconnects the reverse drive gear GRV to or from the second countershaft 50. This arrangement is effective in lightening and compacting the transmission. However, separate clutching means may be provided instead, one for connecting or disconnecting the fourth speed drive gear G4V to or from the second countershaft 50 and the other for connecting or disconnecting the reverse drive gear GRV to or from the second countershaft 50. In this case, these clutching means can be the same friction clutches as used for the other clutching means.

In the above embodiments, a gear (first main drive gear GM1V) provided on the input shaft 10 is used as a commonly used gear both for driving the intermediary shaft 20 (intermediary shaft 20') and for driving the second countershaft 50, but two different (separate) gears may be provided on the input shaft 10 and be used one for driving the intermediary shaft 20 (intermediary shaft 20') and the other for driving the second countershaft 50. However, if a single gear provided on the input shaft 10 is used for driving both the intermediary shaft 20 (intermediary shaft 20') and the second countershaft 50 as described above, then the size of the transmission in its axial direction can be reduced by the degree of the replacement of these two gears with the single or commonly used gear.

Referring to FIG. 1 and FIG. 4, the respective transmissions may further comprise a one-way clutch between the first speed driven gear G1N and the output shaft 60. This arrangement makes the upshift from the forward first speed change ratio to the forward second speed change ratio smooth during the start-up of the vehicle because of the existence of the one-way clutch. In this case, referring to the tables of FIG. 2 and FIG. 5, the first speed clutch CT1 is turned "ON" for the forward drive range from the first speed change ratio to the seventh or eighth speed change ratio, respectively, and it is turned "OFF" for the neutral condition and for the reverse drive.

In the above embodiments, parallel shaft transmissions according to the present invention are exemplified for use in vehicles. However, these embodiments are only examples. The use of parallel shaft transmissions according to the present invention is not limited to vehicles, so it can be used in various powered machines.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2003-288688 filed on Aug. 7, 2003, which is incorporated herein by reference.

What is claimed is:

1. A parallel shaft transmission comprising:
   an input shaft, a first countershaft and an output shaft, which are disposed in parallel with one another;
   a second countershaft, which is provided externally, coaxially and rotatably with respect to said first countershaft;

an input-shaft first gear, which is provided on said input shaft;

an input-shaft second gear, which is provided on said input shaft;

an input-shaft third gear, which is provided rotatably on said input shaft;

first clutching means, which connects or disconnects said input-shaft third gear to or from said input shaft;

a first countershaft gear, which is provided on said first countershaft to mesh with said input-shaft second gear;

second clutching means, which connects or disconnects said first countershaft to or from said second countershaft;

a second countershaft first gear, which is provided rotatably on said second countershaft to mesh with said input-shaft first gear;

third clutching means, which connects or disconnects said second countershaft first gear to or from said second countershaft;

a second countershaft second gear, which is provided rotatably on said second countershaft to mesh with said input-shaft third gear;

fourth clutching means, which connects or disconnects said second countershaft second gear to or from said second countershaft; and an output-shaft first gear, which is provided on said output shaft to mesh with said input-shaft third gear.

2. The parallel shaft transmission as set forth in claim 1, further comprising:

an intermediary shaft and a first idle shaft, which are disposed in parallel with said input shaft;

a first idle gear, which is provided on said first idle shaft to mesh with said input-shaft first gear;

an intermediary shaft first gear, which is provided on said intermediary shaft to mesh with said first idle gear;

an intermediary shaft second gear, which is provided on said intermediary shaft to mesh with said output-shaft first gear; and power-switching means, which enables or disables power transmission between said intermediary shaft first gear and said intermediary shaft second gear.

3. The parallel shaft transmission as set forth in claim 2, wherein:

said intermediary shaft second gear is provided rotatably on said intermediary shaft; and said power-switching means includes fifth clutching means, which connects or disconnects said intermediary shaft second gear to or from said intermediary shaft;

an input-shaft fourth gear, which is provided rotatably on said input shaft;

sixth clutching means, which connects or disconnects said input-shaft fifth gear to or from said input shaft;

an intermediary shaft third gear, which is provided rotatably on said intermediary shaft;

seventh clutching means, which connects or disconnects said intermediary shaft third gear to or from said intermediary shaft; and an output-shaft second gear, which is provided on said output shaft to mesh with said input-shaft fourth gear and with said intermediary shaft third gear.

4. The parallel shaft transmission as set forth in claim 3, further comprising:

a second countershaft third gear, which is provided rotatably on said second countershaft;

a second idle shaft, which is disposed in parallel with said input shaft;

a second idle gear, which is provided on said second idle shaft to mesh with said second countershaft third gear and with said input-shaft fourth gear; and eighth clutching means, which connects or disconnects said second countershaft third gear to or from said second countershaft.

5. The parallel shaft transmission as set forth in claim 4, wherein:

said fourth clutching means and said eighth clutching means comprise one selective clutching means, which connects either said second countershaft second gear or said second countershaft third gear to said second countershaft.

6. The parallel shaft transmission as set forth in claim 5, wherein:

said intermediary shaft is in a hollow figure;

said parallel shaft transmission further comprising:

an auxiliary intermediary shaft, which is provided internally, coaxially and rotatably with respect to said intermediary shaft;

ninth clutching means, which connects or disconnects said auxiliary intermediary shaft to or from said intermediary shaft;

an auxiliary intermediary shaft gear, which is provided on said auxiliary intermediary shaft; and an output-shaft third gear, which is provided on said output shaft to mesh with said auxiliary intermediary shaft gear.

* * * * *